(12) United States Patent
Kersting

(10) Patent No.: US 10,664,542 B2
(45) Date of Patent: May 26, 2020

(54) PLATFORM DEVICE FOR PASSIVELY DISTRIBUTED QUANTITATIVE COLLECTIVE KNOWLEDGE

(71) Applicant: Patrick Faulwetter, Marina Del Rey, CA (US)

(72) Inventor: Björn Kersting, Braunfels (DE)

( * ) Notice: Subject to any disclaimer, the term of this patent is extended or adjusted under 35 U.S.C. 154(b) by 927 days.

(21) Appl. No.: 15/100,455

(22) PCT Filed: Jun. 27, 2014

(86) PCT No.: PCT/DE2014/100215
§ 371 (c)(1),
(2) Date: Oct. 6, 2016

(87) PCT Pub. No.: WO2015/078439
PCT Pub. Date: Jun. 4, 2015

(65) Prior Publication Data
US 2017/0017885 A1    Jan. 19, 2017

(30) Foreign Application Priority Data
Nov. 28, 2013    (WO) ................ PCT/DE2013/100399

(51) Int. Cl.
*G06F 16/955* (2019.01)
*G06F 16/28* (2019.01)
(Continued)

(52) U.S. Cl.
CPC .......... *G06F 16/955* (2019.01); *G06F 16/285* (2019.01); *G06F 16/954* (2019.01);
(Continued)

(58) Field of Classification Search
CPC .. G06F 16/986; G06F 16/9535; G06F 16/954; G06N 5/022; G06Q 10/101
See application file for complete search history.

(56) References Cited

U.S. PATENT DOCUMENTS

| 6,260,064 B1 | 7/2001 | Kurzrok |
| 7,031,952 B1 | 4/2006 | Heumann |
| (Continued) | | |

FOREIGN PATENT DOCUMENTS

| WO | 2013/029602 A1 | 3/2013 |
| WO | 2013/029605 A1 | 3/2013 |

OTHER PUBLICATIONS

BSCW 4.5 Manual (Year: 2011).*
(Continued)

*Primary Examiner* — Hal Schnee
*Assistant Examiner* — Van C Mang
(74) *Attorney, Agent, or Firm* — Bachman & LaPointe, P.C.

(57) ABSTRACT

For a platform device (100) located at a web-site and capable of forming a network with a plurality of ID-detectable users or participants for gathering and processing items of information stored in each case in code-identifiable storage spaces (110) of a platform (100) assigned to a plurality of different topics by the users or participants, a passive automated distribution of information collected by the users or participants is enable in that the storage spaces (110) on the platform (100) are in each case formed by a dual unit DuU, a dual unit DuU comprising in each case a first storage space (111) that is assigned to a predefinable topic and provided with initial items of information (114) formulated by an initial participant and is not editable by any other individual user or participant and also a second storage space (112) assigned to the first storage space (111) and editable by any individual user or participant and construed for insertion, by the plurality of users or participants, of additional information (113) concerning the initial item of information (114) stored in the first storage space (111).

19 Claims, 3 Drawing Sheets

(51) Int. Cl.
  *G06F 16/958*   (2019.01)
  *G06F 16/9535*  (2019.01)
  *G06F 16/954*   (2019.01)
  *G06N 5/02*     (2006.01)
  *G06Q 10/10*    (2012.01)

(52) U.S. Cl.
  CPC ........ *G06F 16/9535* (2019.01); *G06F 16/986* (2019.01); *G06N 5/022* (2013.01); *G06Q 10/101* (2013.01)

(56) References Cited

U.S. PATENT DOCUMENTS

| | | | |
|---|---|---|---|
| 7,447,807 B1 | 11/2008 | Merry | |
| 7,962,482 B2* | 6/2011 | Handman | G06Q 30/02 707/733 |
| 8,127,095 B1 | 2/2012 | Colgrove | |
| 8,612,449 B1 | 12/2013 | Cuthbert | |
| 8,645,295 B1 | 2/2014 | Dillard | |
| 9,613,321 B2 | 4/2017 | Molyneux | |
| 9,984,079 B1 | 5/2018 | Stickle | |
| 2002/0049738 A1 | 4/2002 | Epstein | |
| 2002/0199186 A1 | 12/2002 | Ali | |
| 2003/0093423 A1 | 5/2003 | Larason | |
| 2004/0266743 A1 | 12/2004 | McMahon | |
| 2005/0097188 A1 | 5/2005 | Fish | |
| 2005/0223002 A1 | 10/2005 | Agarwal | |
| 2006/0064411 A1* | 3/2006 | Gross | G06F 16/90324 |
| 2006/0247944 A1 | 11/2006 | Calusinski, Jr. | |
| 2006/0282304 A1 | 12/2006 | Bedard | |
| 2007/0061211 A1 | 3/2007 | Ramer | |
| 2008/0114629 A1 | 5/2008 | Pavlov | |
| 2008/0201418 A1 | 8/2008 | Krishnan | |
| 2009/0259526 A1 | 10/2009 | Bechtel | |
| 2010/0023382 A1 | 1/2010 | Fushimi | |
| 2010/0049683 A1* | 2/2010 | Carter | G06Q 10/10 706/46 |
| 2010/0115215 A1 | 5/2010 | Rosychuk | |
| 2010/0205006 A1 | 8/2010 | Bergh | |
| 2010/0205543 A1 | 8/2010 | Von Werther | |
| 2010/0306223 A1 | 12/2010 | Lee | |
| 2011/0016179 A1 | 1/2011 | Bechtel | |
| 2011/0055017 A1 | 3/2011 | Solomon | |
| 2011/0106757 A1 | 5/2011 | Pickney | |
| 2011/0178981 A1 | 7/2011 | Bowen | |
| 2011/0231350 A1 | 9/2011 | Momma | |
| 2012/0110429 A1 | 5/2012 | Tzonis | |
| 2013/0159289 A1 | 6/2013 | Matthews | |
| 2013/0246643 A1 | 9/2013 | Luby | |
| 2013/0339301 A1 | 12/2013 | Saito | |
| 2014/0181210 A1 | 6/2014 | Kersting | |
| 2014/0310285 A1 | 10/2014 | Chan | |
| 2014/0330831 A1 | 11/2014 | Kersting | |
| 2014/0365457 A1 | 12/2014 | Kersting et al. | |
| 2014/0372432 A1 | 12/2014 | Kersting | |
| 2015/0347480 A1 | 12/2015 | Smart | |
| 2017/0017885 A1* | 1/2017 | Kersting | G06Q 10/101 |

OTHER PUBLICATIONS

Antunes Pedro "Reviewing the quality of awareness support in collaborative applications", 2013 (Year: 2013).*
Basic Support for Cooperative Work, Version 4.4, Oct. 2007, OrbiTeam Software GmbH & Co. KG, Bonn, Germany.
International Search Report for PCT/DE2014/100216, dated Nov. 13, 2014.
International Search Report for PCT/DE2014/100210, dated Nov. 5, 2014.
International Search Report for PCT/DE2014/100211, dated Nov. 13, 2014.
International Search Report for PCT/DE2014/100213, dated Nov. 13, 2014.
International Search Report for PCT/DE2014/100214, dated Nov. 18, 2014.
International Search Report for PCT/DE2014/100215, dated Nov. 13, 2014.
BSCW 4.4 Manual, Nov., 2008, OrbiTeam Software GmbH & Co. KG, Bonn, Germany.
U.S. Office Action dated Dec. 18, 2019 for U.S. Appl. No. 15/100,431.
U.S. Office Action dated Aug. 21, 2019 for U.S. Appl. No. 15/100,431.
U.S. Office Action dated Feb. 26, 2019 for U.S. Appl. No. 15/100,431.
U.S. Office Action dated Nov. 19, 2019 for U.S. Appl. No. 15/100,434.
U.S. Office Action dated Jun. 6, 2019 for U.S. Appl. No. 15/100,434.
U.S. Office Action dated Oct. 9, 2019 for U.S. Appl. No. 15/100,443.
U.S. Office Action dated Apr. 1, 2019 for U.S. Appl. No. 15/100,443.
U.S. Office Action dated Sep. 7, 2018 for U.S. Appl. No. 15/100,443.
U.S. Office Action dated Nov. 26, 2018 for U.S. Appl. No. 15/100,440.

* cited by examiner

PLATFORM DEVICE FOR PASSIVELY DISTRIBUTED QUANTITATIVE COLLECTIVE KNOWLEDGE

BACKGROUND

The present invention relates to a platform device located at a web-site and capable of forming a network with a plurality of ID-detectable users or participants for gathering and processing items of information stored in each case in code-identifiable storage spaces of a platform assigned to a plurality of different topics by the users or participants.

Platform devices of the type mentioned above are known in the prior art for a number of applications.

Said devices are for example operated in the world-wide internet.

However the prior platform devices exhibit the drawback that it is not possible to achieve a specific selection of predefinable links and at the same time to define links achievable according to predefinable criteria.

One reason for this is that the current platforms store items of information, without strictly predefinable processing criteria and strictly predefinable evaluation criteria being attributed to these items of information.

Moreover, the prior platform devices are not efficient in the distribution of collective knowledge.

SUMMARY

Thus it is an object of the present invention to provide a platform device, by means of which items of information stored in a first memory are utilizable by the network participants according to strictly predefinable processing criteria and are capable of being supplemented or amended in some other manner and by means of which an effective automated distribution of, in particular, collective knowledge representing an item of qualitative information is enabled.

For a platform device of the type mentioned above this object is achieved in that the storage spaces are in each case formed on the platform by a dual unit DuU, wherein a dual unit DuU in each case comprises a first storage space that is assigned to a predefinable topic and provided with initial items of information formulated by an initial participant and is not editable by any other user or participant and also a second storage space assigned to the first storage space that is editable by any individual user or participant and is construed for insertion of additional information concerning the initial item of information stored in the first storage space by the plurality of users or participants, and wherein on recognition of the predefined topic by a search engine located at a web site, by means of a search item designated as electronic filter that corresponds to the predefined topic of the associated dual unit, a copying device copies the contents of the first storage space of the dual unit and the contents of the second storage space of the dual unit and transfers said contents as a bundle of information to the search engine located at a web site.

Preferred embodiments of the invention are subject matter of the subclaims.

In the case of the platform device of the invention, on account of the combination of features to the effect that the storage spaces are in each case formed on the platform by a dual unit DuU, a dual unit DuU comprising in each case a first storage space assigned to a predefinable topic and provided with initial items of information formulated by an initial participant but not editable by any other individual user or participant, and also a second storage space assigned to the first storage space and editable by any individual user or participant and construed for insertion of additional information concerning the initial item of information stored in the first storage space by the plurality of users or participants, while on recognition of the predefined topic by a search engine located at a web site by means of a search item designated as electronic filter, a copying device copies the contents of the first storage space of the dual unit and the contents of the second storage space of the dual unit and transfers the same as a bundle of information to the search engine located at a web site, which combination of features has the result that, by way of the formation of dual units, items of information, particularly those forming an item of qualitative information, are capable of being processed according to very specific processing stipulations, are capable of being changed, and are then capable of being stored, wherein the items of information provided in the form of individual evaluations, individual supplements, and individual comments provide a form of collective knowledge which is transferable to a predeterminable number of users or participants by means of strictly predefinable criteria per passive automated transmission (DuU feed).

The aim and purpose of a processing operation capable of being carried out by the plurality of users or participants is thus primarily to render an initial item of information which has been imported to a first storage space of a dual unit by an initial author, suitable for utilization and processing by other users or participants so as to provide the initial item of information with a reliability rating or alternatively reliability evaluation which is imported to the first storage space on conclusion of a processing operation accomplished according to the invention and which represents, for all interested persons, a clearly defined collective evaluation carried out by the users or participants.

According to a first preferred embodiment of the device of the invention provision is made such that in the editable second storage space additional information is capable of being imported in the form of quantitative evaluations of the items of information stored in the first storage space by the users or participants, a quantitative evaluation being defined as the number of predefined inputs into the second storage space as carried out by the users or participants.

According to another preferred embodiment of the device of the invention provision is made such that additional information can be provided in the editable second storage space in the form of individual evaluations of the items of information stored in the first storage space by the users or participants, wherein at least one adding device is provided for counting the individual evaluations entered and also a memory in the second storage space for saving the number of counted individual evaluations, wherein an individual evaluation can be effected by the users or participants by means of a predefined insertion, and wherein a collective value is defined as the quantitative number of predefined inputs entered into the second storage space carried out by the users or participants.

Preferably, there is provided a first adding device for counting the entered individual positive evaluations and also a memory for saving this number to the second storage space, and there is provided a second adding device for counting the entered individual negative evaluations and also a memory for saving this number to the second storage space, wherein an individual evaluation can be effected by the users or participants by means of a predefined input, and a positive collective value is defined as the number of predefined inputs into the second storage space that correspond to a positive evaluation, and a negative collective value is defined as the number of predefined inputs into the second storage space that correspond to a negative evaluation.

According to the above embodiment there is provided the first adding device preferably in order to add the positive evaluations stored in the second storage space to a first number, wherein the second adding device is adapted so as to add the negative evaluations stored in the second storage space to a second number, and wherein a first dividing device is provided in order to state the ratio of the first number to the second number in the form of a percentage value.

According to an important preferred embodiment of the device of the invention provision is made such that a first copying device is provided that interprets successively the evaluations stored in the second storage space within predefinable time intervals as useful items of information and transfers the same to the first storage space whilst overwriting the relevant previous items of information in the first storage space.

According to a preferred embodiment of the device of the invention similar to the above embodiment the editable second storage space is subdivided into a contents storage space, into which additional information to the items of information stored in the first storage space can be imported in the form of supplementary information of the items of information stored in the first storage space, and an evaluation storage space, into which exclusively evaluations of the supplementary information stored in the second storage space can be imported, which are subdivided into positive evaluations of the supplementary information stored in the second storage space and negative evaluations of the supplementary information stored in the second storage space.

In this case, there are preferably provided a third adding device for counting the entered individual positive evaluations of the supplementary information and also a memory for saving this number to the second storage space, wherein a fourth adding device is provided for counting the entered individual negative evaluations of the supplementary information and also a memory for saving this number to the second storage space, and wherein an individual evaluation can be effected by the users or participants by means of a predefined input, and a positive collective value of the supplementary information is defined as the number of predefined inputs into the second storage space that correspond to a positive evaluation, and a negative collective value of the supplementary information is defined as the number of predefined inputs into the second storage space that correspond to a negative evaluation.

Preferably, the third adding device adds the positive evaluations stored in the second storage space within time intervals predefinable by a timing device to a third number, while the fourth adding device adds the negative evaluations stored in the second storage space within the time intervals predefined by the timing device to a fourth number, wherein a second dividing device is provided in order to state the ratio of the third number to the fourth number in the form of a percentage value.

Preferably, a second copying device is likewise provided that, on determining, in a first decision-making device, a predetermined ratio of positive evaluations to negative evaluations of the supplementary information stored in the second storage space, interprets the supplementary information stored in the second storage space as assured items of information and transfers the same to the first storage space whilst overwriting the relevant previous items of information in the first storage space.

The third and fourth adding devices and also the second dividing device and the second copying device are preferably construed so as to repeat the currently assigned function, on conclusion of a timer-defined time interval of predefined length, in a respective subsequent period of time of equal length, after zeroing the third and fourth numbers.

According to a preferred embodiment of the device of the invention similar to the above embodiment, the editable second storage space is subdivided into a contents storage space, into which additional information to the items of information stored in the first storage space can be imported in the form of corrective information of the items of information stored in the first storage space, and an evaluation storage space, into which exclusively evaluations of the corrective information stored in the second storage space can be imported, which are subdivided into positive evaluations of the corrective information stored in the second storage space and negative evaluations of the corrective information stored in the second storage space.

In this case, there are preferably provided a fifth adding device for counting the entered individual positive evaluations of the corrective information and also a memory for saving this number to the second storage space, and a sixth adding device for counting the entered individual negative evaluations of the corrective information and also a memory for saving this number to the second storage space, wherein an individual evaluation can be effected by the users or participants by means of a predefined input, while a positive collective value of the corrective information is defined as the number of predefined inputs into the second storage space that correspond to a positive evaluation, and a negative collective value of the corrective information is defined as the number of predefined inputs into the second storage space that correspond to a negative evaluation.

The fifth adding device is preferably construed so as to add the positive evaluations stored in the second storage space within time intervals predefinable by a timing device to a fifth number, while the sixth adding device adds the negative evaluations stored in the second storage space within the time intervals predefined by the timing device to a sixth number and a third dividing device is provided in order to state the ratio of the fifth number to the sixth number in the form of a percentage value.

In addition, a third copying device is preferably provided that, on determination, in a second decision-making device, of a predetermined ratio of positive evaluations to negative evaluations of the corrective information stored in the second storage space, interprets the corrective information stored in the second storage space as assured items of information and transfers the same to the first storage space whilst overwriting the relevant original items of information present in the first storage space.

The fifth and sixth adding devices and also the third dividing device and the third copying device are preferably construed so as to repeat the currently assigned function, on conclusion of a timer-defined time interval of predefined length, in a respective subsequent period of time of equal length, after zeroing the fifth and sixth numbers.

With respect to the device of the invention, a predefined input in the case of an individual positive evaluation can be realized, for example, by the insertion of the Arabic numeral '+1', and a predetermined defined input in the case of an individual negative evaluation can be realized, for example, by the insertion of the Arabic numeral '−1'.

Preferably, it is possible for any of the users or participants to make an initial placement of a dual unit have first and second storage spaces, as initial participant.

BRIEF DESCRIPTION OF THE DRAWINGS

The device of the invention is described below with reference to a preferred embodiment as illustrated in the Figures of the accompanying drawings, in which.

DETAILED DESCRIPTION

Figure 1:
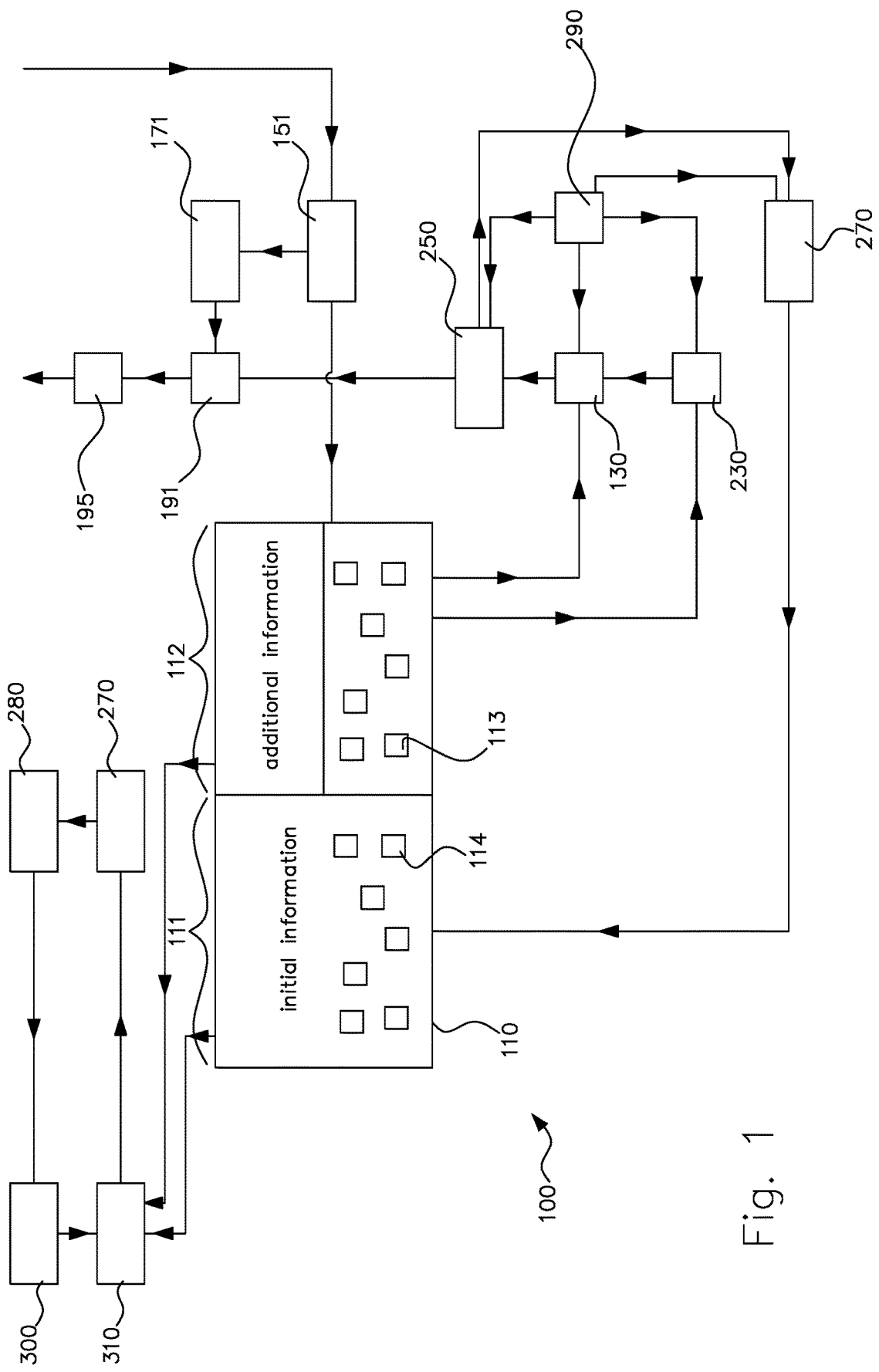
FIG. 1 shows a general layout of a dual unit DuU corresponding to a preferred embodiment of the invention in the form of a block diagram.

The platform device 100 of the invention located at a web-site is networkable with a plurality of ID-detectable users or participants and is construed for gathering and processing items of information stored on a plurality of in each case code-identifiable and in each case topic-dependent storage spaces 110 of a platform 100 by the users or participants.

In the case of recognition of the predefined topic by a search engine located at a web-site by means of a search item designated as electronic filter 310 and corresponding to the predefined topic of the associated dual unit, a copying device 270 copies the contents of the first storage space 111 of the dual unit and the contents of the second storage space 112 of the dual unit and transfers these contents by means of a transmitting unit 280 as a bundle of information to the search engine 300 located at a web site.

In the case of the embodiment of the device of the invention shown in FIG. 1, additional information 113 can be included by the users or participants in the editable second storage space 112 in the form of quantitative evaluations of the items of information stored in the first storage space 111, a quantitative evaluation being defined as the number of predefined inputs into the second storage space 112 carried out by the users or participants.

In the editable second storage space 112 additional information 113 can be imported in the form of individual evaluations of the items of information stored in the first storage space by the users or participants, there being provided in the second storage space 112 at least one adding device 130 for counting the individual evaluations entered and also a memory for saving the number of counted individual evaluations, while an individual evaluation can be provided by the users or participants by means of a predefined input, a collective value being defined as the quantitative number of predefined inputs into the second storage space 112 as carried out by the users or participants.

A first adding device 130 is provided for counting the individually entered positive evaluations and also a memory is provided for saving this number to the second storage space 112, while a second adding device 230 is provided for counting the individually entered negative evaluations and also a memory is provided for saving this number to the second storage space 112, wherein an individual evaluation can be provided by the users or participants by means of a predefined input, a positive collective value being defined as the number of predefined inputs into the second storage space 112 that correspond to a positive evaluation, while a negative collective value is defined as the number of predefined inputs into the second storage space 112 that correspond to a negative evaluation.

The first adding device 130 is adapted so as to add the positive evaluations stored in the second storage space 112 to a first number, and the second adding device 230 is adapted so as to add the negative evaluations stored in the second storage space 112 to a second number, while a first dividing device 250 is provided in order to state the ratio of the first number to the second number in the form of a percentage value.

A first copying device 270 is provided that successively interprets the evaluations stored in the second storage space within predefinable time intervals as useful items of information and transfers the same to the first storage space 111 whilst overwriting the relevant previous items of information in the first storage space 111.

A timing device 290 is provided that transmits reset signals in predefinable constant time intervals to the first and second adding devices 130, 230 and also to the first dividing device 250 and to the first copying device 270 so as to set the associated devices to zero on conclusion of a respective presettable time interval and to repeat the currently assigned function in a respective subsequent period of time of equal length.

Figure 2:
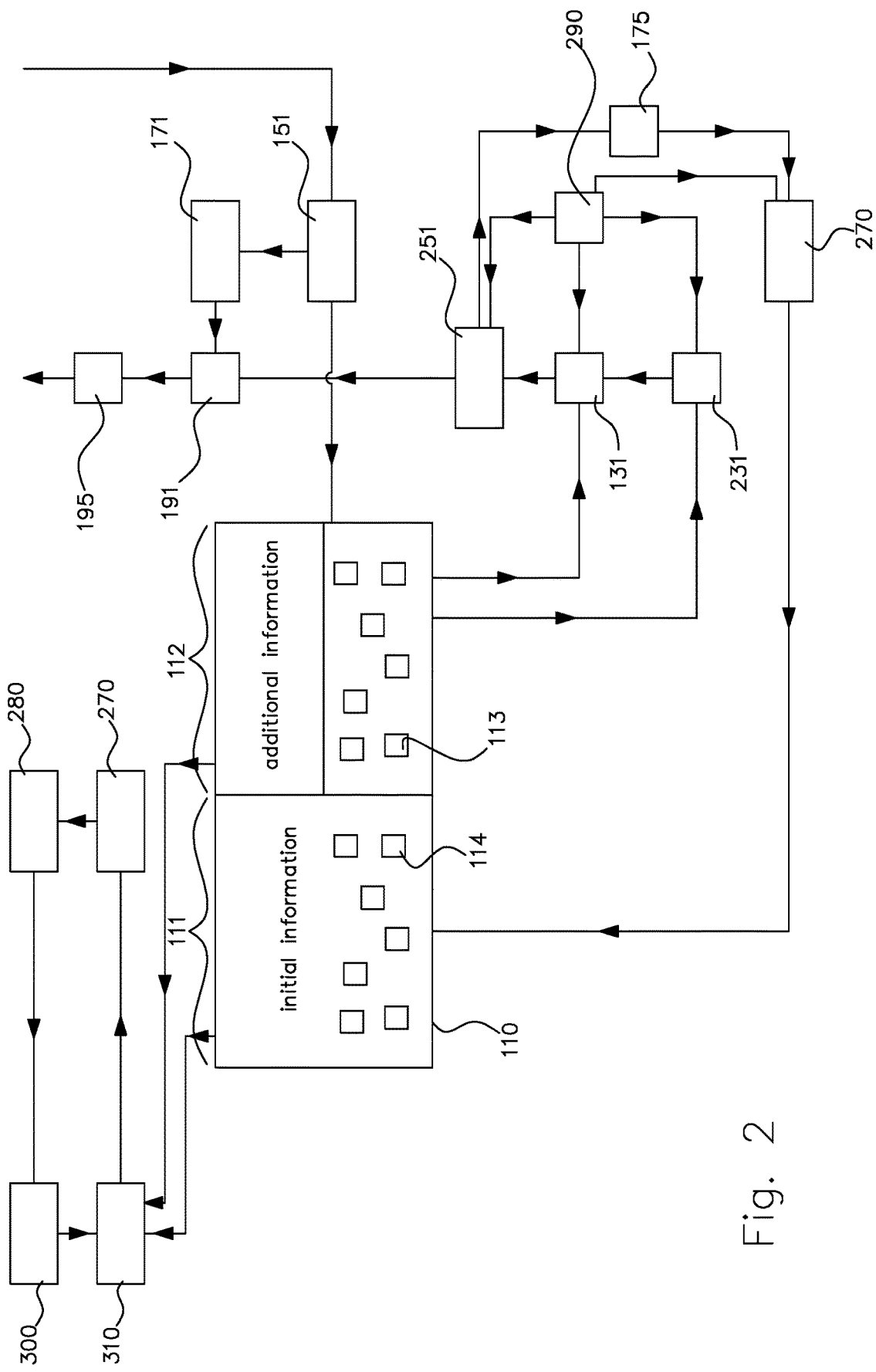
FIG. 2 shows a second embodiment of the device of the invention in a block view.

In the case of the embodiment of the device of the invention 100 shown in FIG. 2 the editable second storage space 112 is subdivided into a contents storage space, into which additional information 113 to the items of information stored in the first storage space 111 can be imported in the form of supplementary information of the items of information stored in the first storage space 111, and an evaluation storage space, into which exclusively evaluations of the supplementary information stored in the second storage space 112 can be imported that are subdivided into positive evaluations of the supplementary information stored in the second storage space 112 and negative evaluations of the supplementary information stored in the second storage space 112.

A third adding device 131 is provided for counting the individually entered positive evaluations of the supplementary information and in addition a memory is provided for saving this number to the second storage space 112, wherein a fourth adding device 231 is provided for counting the individually entered negative evaluations of the supplementary information and also a memory for saving this number to the second storage space 112, wherein an individual evaluation can be provided by the users or participants by means of a predefined input, while a positive collective value of the supplementary information is defined as the number of predefined inputs into the second storage space 112 that correspond to a positive evaluation, and a negative collective value of the supplementary information is defined as the number of predefined inputs into the second storage space 112 that correspond to a negative evaluation.

The third adding device 131 adds the positive evaluations stored in the second storage space, within time intervals predefinable by a timing device, to a third number, and the fourth adding device 231 adds the negative evaluations stored in the second storage space 112, within the time intervals predefined by the timing device, to a fourth number, while a second dividing device 251 is provided in order to state the ratio of the third number to the fourth number in the form of a percentage value.

A second copying device 270 is provided that on determination, in a first decision-making device 175, of a predetermined ratio of positive evaluations to negative evaluations of the supplementary information stored in the second storage space 112 interprets the supplementary information stored in the second storage space 112 as assured items of information and transfers the same to the first storage space 111.

The third and fourth adding devices 131, 231 and also the second dividing device 251 and the second copying device 270 are construed so as to repeat the currently assigned function on conclusion of the time interval of predefined length as predefined by the timing device 290 in a respective subsequent period of time of equal length, after zeroing the third and fourth numbers.

Figure 3:
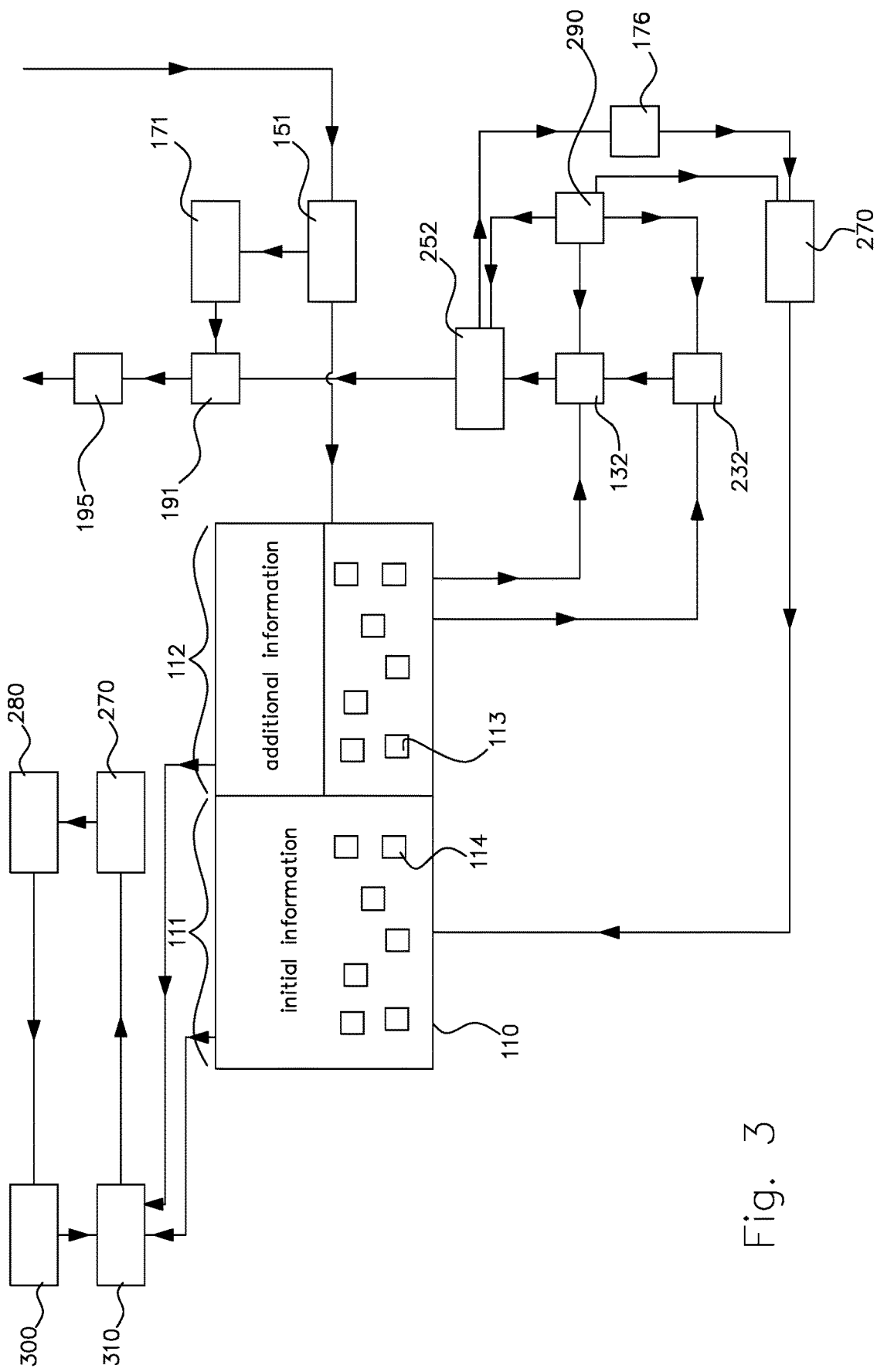
FIG. 3 shows a third embodiment of the device of the invention in a block view.

In the case of the embodiment of the device of the invention shown in FIG. 3 the editable second storage space is subdivided into a contents storage space, into which additional information 113 to the items of information stored in the first storage space 111 can be imported in the form of corrective information of the items of information stored in the first storage space 111, and an evaluation storage space, into which exclusively evaluations of the corrective information stored in the second storage space 112 can be imported that are subdivided into positive evaluations of the corrective information stored in the second storage space 112 and negative evaluations of the corrective information stored in the second storage space 112.

A fifth adding device 132 is provided for counting the individually entered positive evaluations of the corrective information, and in addition a memory is provided for saving this number to the second storage space 112, while a sixth adding device 232 is provided for counting the individually entered negative evaluations of the corrective information and also a memory is provided for saving this number to the second storage space 112, wherein an individual evaluation can be provided by the users or participants by means of a predefined input, while a positive collective value of the corrective information is defined as the number of predefined inputs into the second storage space 112 that correspond to a positive evaluation, and a negative collective value of the corrective information is defined as the number of predefined inputs into the second storage space 112 that correspond to a negative evaluation.

The fifth adding device 132 adds the positive evaluations stored in the second storage space within time intervals predefinable by a timing device to a fifth number, and the sixth adding device 232 adds the negative evaluations stored in the second storage space 112 within the time intervals predefined by the timing device to a sixth number, while a third dividing device 252 is provided in order to state the ratio of the fifth number to the sixth number in the form of a percentage value.

A third copying device 270 is provided that on determination, in a second decision-making device 176, of a predetermined ratio of positive evaluations to negative evaluations of the corrective information stored in the second storage space 112, interprets the corrective information stored in the second storage space 112 as assured items of information and ransfers the same to the first storage space 111 whilst overwriting the relevant original items of information present in the first storage space 111.

The fifth and sixth adding devices 132, 232 and also the third dividing device 252 and the third copying device 270 are construed so as to repeat the currently assigned function on conclusion of the time interval of predefined length as predefined by the timing device 290 in a respective subsequent period of time of equal length, after zeroing the fifth and sixth numbers.

In the case of all three of the above embodiments of the platform device 100 of the invention a predefined input is realized, in the case of an individual positive evaluation, by the insertion of the Arabic numeral '+1' and in the case of an individual negative evaluation, by the insertion of the Arabic numeral '+1'.

Any one of the users or participants is capable of making an initial placement of a dual unit having first and second storage spaces 111, 112, as initial participant.

The embodiment of the invention explained above merely serves the purpose of providing a better understanding of the teaching of the invention, which is not restricted, as such, to the present embodiment.

The invention claimed is:

1. A platform device (100) located at a web-site and capable of forming a network with a plurality of users or participants for gathering and processing items of information stored in each case in code-identifiable storage spaces (110) of the platform device (100) assigned to a plurality of different topics by the users or participants, each of the users or participants having an identification (ID), wherein:

the storage spaces (110) on the platform (100) are each formed by a dual unit (DuU), each dual unit DuU comprising a first storage space (111) that is assigned to a predefinable topic and provided with initial items of information (114) formulated by an initial participant and is not editable by any other individual user or participant and also a second storage space (112) assigned to the first storage space (111) and editable by any individual user or participant and construed for insertion of additional information (113) concerning the initial item of information (114) stored in the first storage space (111) by the plurality of users or participants, and wherein, on recognition of the predefined topic by a search engine (300) located at the web site, by means of a search item designated as electronic filter (310) and which corresponds to the predefined topic of the associated dual unit, a copying device (270) copies the contents of the first storage space (111) and the contents of the second storage space (112) of the dual unit by means of a transmitting unit (280) and transfers the same as a bundle of information to the search engine (300) located at the web site;

additional information is stored in the editable second storage space (112) in the form of individual evaluations of the items of information stored in the first storage space (111) by the users or participants, wherein at least one adding device (130) is provided for counting the individual evaluations entered and also a memory in the second storage space (112) for saving the number of counted individual evaluations, while an individual evaluation is provided by the users or participants by means of a predefined input, a collective value being defined as the quantitative number of predefined inputs into the second storage space (112) as carried out by the users or participants;

a first adding device (130) is provided for counting the individually entered positive evaluations and also a memory for saving this number to the second storage space (112), and a second adding device (230) is provided for counting the individually entered negative evaluations and also a memory for saving this number to the second storage space (112), wherein an individual evaluation is provided by the users or participants by means of a predefined input, while a positive collective value is defined as the number of predefined inputs into the second storage space (112) that correspond to a positive evaluation, and a negative collective value is defined as the number of predefined inputs into the second storage space (112) that correspond to a negative evaluation.

2. A device as claimed in claim 1, characterized in that the additional information (113) in the editable second storage space (112) is imported in the form of quantitative evaluations of the items of information stored in the first storage space (111) by the users or participants, a quantitative evaluation being defined as the number of predefined inputs into the second storage space (112) carried out by the users or participants.

3. A platform device as claimed in claim 1 characterized in that a first adding device (130) is provided that summates the positive evaluations stored in the second storage space (112) to give a first number, and a second adding device (230) is provided that summates the negative evaluations stored in the second storage (112) space to give a second number, and a first dividing device (250) is provided for the purpose of calculating the ratio of the first and second numbers as a percentage value.

4. A platform device as claimed in claim 3, characterized in that a first copying device is provided that successively interprets evaluations stored in the second storage space (112) within predefinable time intervals as useful items of information and transfers the same to the first storage space (111) while overwriting previous relevant items of information in the first storage space (111).

5. A platform device as claimed in claim 4, characterized in that a timing device (290) is provided that transmits reset signals in predefinable constant time intervals to the first adding device (130) and to the second adding device (230) and also to the first dividing device (250) and to the first copying device (270) so as to set the associated devices to zero on conclusion of a respective presettable time interval and to repeat the currently assigned function in a respective subsequent period of time of equal length.

6. A platform device as claimed in claim 1, characterized in that the editable second storage space (112) is subdivided into a contents storage space, into which additional information (113) to the items of information stored in the first storage space (111) is imported in the form of supplementary information of the items of information stored in the first storage space (111), and an evaluation storage space, into which exclusively evaluations of the supplementary information stored in the second storage space (112) is imported that are subdivided into positive evaluations of the supplementary information stored in the second storage space (112) and negative evaluations of the supplementary information stored in the second storage space (112).

7. A platform device as claimed in claim 6, characterized in that a third adding device (131) is provided for counting the individually entered positive evaluations of the supplementary information and also a memory for saving this number to the second storage space (112), and a fourth adding device (231) is provided for counting the individually entered negative evaluations of the supplementary information and also a memory for saving this number to the second storage space (112), wherein an individual evaluation is provided by the users or participants by means of a predefined input, while a positive collective value of the supplementary information is defined as the number of predefined inputs into the second storage space (112) that correspond to a positive evaluation, and a negative collective value of the supplementary information is defined as the number of predefined inputs into the second storage space (112) that correspond to a negative evaluation.

8. A platform device as claimed in claim 7, characterized in that the third adding device (131) adds the positive evaluations stored in the second storage space (112) within time intervals predefinable by a timing device (290) to a third number, and the fourth adding device (231) adds the negative evaluations stored in the second storage space (112) within the time intervals predefined by the timing device (290) to a fourth number, and a second dividing device (251) is provided in order to state the ratio of the third number to the fourth number in the form of a percentage value.

9. A platform device as claimed in claim 8, characterized in that a second copying device (270) is provided that on determination, in a first decision-making device (175), of a predetermined ratio of positive evaluations to negative evaluations of the supplementary information stored in the second storage space (112) interprets the supplementary information stored in the second storage space (112) as assured items of information and transfers the same to the first storage space (111).

10. A platform device as claimed in claim 9, characterized in that the third adding device (131) and fourth adding device (231) and also the second dividing device (251) and the second copying device (270) are construed so as to repeat the currently assigned function, on conclusion of the time interval of predefined length as predefined by the timing device (290), in a respective subsequent period of time of equal length, after zeroing the third and fourth numbers.

11. A platform device as claimed in claim 1, characterized in that the editable second storage space (112) is subdivided into a contents storage space, into which additional information to the items of information stored in the first storage space (111) is imported in the form of corrective information of the items of information stored in the first storage space (111), and an evaluation storage space, into which exclusively evaluations of the corrective information stored in the second storage space (112) is imported that are subdivided into positive evaluations of the corrective information stored in the second storage space (112) and negative evaluations of the corrective information stored in the second storage space (112).

12. A platform device as claimed in claim 11, characterized in that a fifth adding device (132) is provided for counting the individually entered positive evaluations of the corrective information and also a memory for saving this number to the second storage space (112), and a sixth adding device (232) is provided for counting the individually entered negative evaluations of the corrective information and also a memory is provided for saving this number to the second storage space (112), wherein an individual evaluation is provided by the users or participants by means of a predefined input, while a positive collective value of the corrective information is defined as the number of predefined inputs into the second storage space (112) that correspond to a positive evaluation, and a negative collective value of the corrective information is defined as the number of predefined inputs into the second storage space (112) that correspond to a negative evaluation.

13. A platform device as claimed in claim 12, characterized in that the fifth adding device (132) adds the positive evaluations stored in the second storage space (112) within time intervals predefinable by a timing device (290) to a fifth number, and the sixth adding device (232) adds the negative evaluations stored in the second storage space (112) within the time intervals predefined by the timing device (290) to a sixth number, and a third dividing device (252) is provided in order to state the ratio of the fifth number to the sixth number in the form of a percentage value.

14. A platform device as claimed in claim 13, characterized in that a third copying device (270) is provided that on determination, in a second decision-making device (176), of a predetermined ratio of positive evaluations to negative evaluations of the corrective information stored in the second storage space (112) interprets the corrective information stored in the second storage space (112) as assured items of information and transfers the same to the first storage space (111) whilst overwriting the relevant original items of information present in the first storage space (111).

15. A platform device as claimed in claim 14, characterized in that the fifth adding device (132) and the sixth adding device (232) and also the third dividing device (252) and the third copying device (270) are construed so as to repeat the currently assigned function on conclusion of the time interval of predefined length as predefined by the timing device (290), in a respective subsequent period of time of equal length, after zeroing the fifth and sixth numbers.

16. A platform device as claimed in claim 1, characterized in that a predefined input is realized in the case of an individual positive evaluation by the insertion of the Arabic numeral '+1'.

17. A platform device as claimed in claim 1, characterized in that a predefined input is realized in the case of an individual negative evaluation by the insertion of the Arabic numeral '-1'.

18. A platform device as claimed in claim 1, characterized in that any one of the participants is entitled to an initial insertion of a dual unit having a first storage space (111) and a second storage space (112).

19. A method for operating a web-site the web site forming a network with a plurality of users or participants for gathering and processing items of information stored in each case in code-identifiable storage spaces (110) of a platform device (100) assigned to a plurality of different topics by the users or participants, the storage spaces (110) on the platform (100) each formed by a dual unit (DuU), each dual unit DuU comprising a first storage space (111) that is assigned to a predefinable topic and provided with initial items of information (114) formulated by an initial participant and is not editable by any other individual user or participant and also a second storage space (112) assigned to the first storage space (111) and editable by any individual user or participant and construed for insertion of additional information (113) concerning the initial item of information (114) stored in the first storage space (111) by the plurality of users or participants, each of the users or participants having an identification (ID), the method comprising:

on recognition of the predefined topic by a search engine (300) located at the web site, copying the contents of the first storage space (111) and the contents of the second storage space (112) of the dual unit;

transferring the same the contents of the first storage space (111) and the contents of the second storage space (112) as a bundle of information to the search engine (300);

providing additional information in the editable second storage space (112) in the form of individual evaluations of the items of information stored in the first storage space (111) by the users or participants;

counting the individual evaluations entered; saving, in a memory in the second storage space (112), the number of counted individual evaluations, where an individual evaluation is provided by the users or participants by means of a predefined input, a collective value being defined as the quantitative number of predefined inputs into the second storage space (112) as carried out by the users or participants;

counting the individually entered positive evaluations and saving this number to a memory in the second storage space (112);

counting the individually entered negative evaluations and saving this number to a memory in the second storage space (112), wherein an individual evaluation is provided by the users or participants by means of a predefined input, while a positive collective value is defined as the number of predefined inputs into the second storage space (112) that correspond to a positive evaluation, and a negative collective value is defined as the number of predefined inputs into the second storage space (112) that correspond to a negative evaluation.

* * * * *